(12) United States Patent
Pearson

(10) Patent No.: US 8,021,128 B2
(45) Date of Patent: Sep. 20, 2011

(54) FLUID PUMP AND MOTOR UNIT

(76) Inventor: Colin Alfred Pearson, London (GB)

( * ) Notice: Subject to any disclaimer, the term of this patent is extended or adjusted under 35 U.S.C. 154(b) by 359 days.

(21) Appl. No.: 11/918,079

(22) PCT Filed: Apr. 21, 2006

(86) PCT No.: PCT/GB2006/001484
§ 371 (c)(1),
(2), (4) Date: Oct. 24, 2007

(87) PCT Pub. No.: WO2006/114591
PCT Pub. Date: Nov. 2, 2006

(65) Prior Publication Data
US 2008/0152522 A1 Jun. 26, 2008

(51) Int. Cl.
*F04B 35/00* (2006.01)
(52) U.S. Cl. .......................... 417/375; 417/392; 417/401
(58) Field of Classification Search .................. 417/392, 417/375, 559, 401; 91/19; 92/13.41, 131, 92/18, 85, 243–246, 12.1; 137/543.19, 543.21; 210/652
See application file for complete search history.

(56) References Cited

U.S. PATENT DOCUMENTS

| | | | | |
|---|---|---|---|---|
| 2,911,270 A * | 11/1959 | White | ............................. | 92/244 |
| 3,913,460 A * | 10/1975 | Wright | ......................... | 92/85 R |
| 5,546,981 A * | 8/1996 | Li et al. | ...................... | 137/493.3 |
| 7,322,272 B2 * | 1/2008 | Muller | .......................... | 92/85 R |

FOREIGN PATENT DOCUMENTS

| | | | |
|---|---|---|---|
| EP | 0059275 | | 9/1982 |
| GB | 2319570 | | 5/1998 |
| GB | 2319570 A | * | 5/1998 |
| GB | 2391912 | | 2/2004 |
| WO | 2004/016947 | | 2/2004 |

OTHER PUBLICATIONS

UK Search Report from UK application 0508229.2 dated Jul. 22, 2005.
International Search Report from International Application PCT/GB2006/001484 dated Jul. 11, 2006.

* cited by examiner

*Primary Examiner* — Charles G Freay
*Assistant Examiner* — Todd D Jacobs
(74) *Attorney, Agent, or Firm* — Claude A. S. Hamrick; IPXLAW Group LLP

(57) ABSTRACT

A pump powered partly by a mechanical drive and partly by a pressurized fluid flow and comprised of one or more piston-in-cylinder assemblies in which one face of each piston provides a pumping action while a pressurized driving fluid flow is applied to the opposite piston face, thus supplementing the drive force applied to each piston via a piston rod. Input and output of the pumped flow is controlled by pump valves of a non-return poppet type operated by the pumped flow. Input and output of the driving fluid is controlled by poppet-type valves controlled by connection to the pump valves. Piston movement relative to both the cylinder and the piston rod is controlled, and a two-part pump valve is provided to simplify connection to the motor valves.

20 Claims, 3 Drawing Sheets

US 8,021,128 B2

FLUID PUMP AND MOTOR UNIT

CROSS-REFERENCE TO RELATED APPLICATIONS

This application is a 371 National Stage of International application No. PCT/GB2006/001484, filed Apr. 21, 2006 and published in English as WO 2006/114591 A2 on Nov. 2, 2006. This application claims the benefit of GB 0508229.2, filed Apr. 23, 2005. The disclosure(s) of the above applications are incorporated herein by reference.

The invention herein described relates to a pump and motor unit powered partly by a mechanical drive and partly by a pressurised fluid flow. The unit is particularly applicable to reverse osmosis systems, which commonly waste a large part of their input energy by failing to recover the energy in a pressurized waste fluid flow. Energy savings up to 80% are possible.

The pump and motor unit consists of one or more piston-in-cylinder assemblies. In operation, each piston reciprocates within its cylinder. One face of each piston provides a pumping action while the opposite face acts as a motor, driven by a pressurised driving fluid flow, thus supplementing a mechanical drive force applied to each piston via a piston rod. Input and output of the pumped flow is controlled by pump valves preferably of a non-return poppet type, opened and closed by the pressure differential across them of the pumped flow. Input and output of the driving fluid is controlled by motor valves which may also be of poppet type and are controlled by operational connection to the pump valves. A feature of the pump is that it may conveniently use poppet valves for both pump and drive valves. A poppet valve in this context is one in which the moving element or poppet has an axis of operational movement along a polar axis of an annular valve seat having a radically-extending dimension. Thus the annular valve seat may be planar and preferably perpendicular to the polar axis or may be a three-dimensional surface of revolution eg. part of a conical or spherical surface. Poppet valves have advantages over other valve types in that there is little wear on their sealing surfaces and no requirement for expensive close-tolerance manufacture.

Each piston is mounted on its associated piston rod by means allowing limited axial travel of the piston relative to its rod. This enables movement of the piston rod to pressurise and depressurise fluid on both faces of the piston at the beginning of each respective pumping and return stoke, prior to opening of the relevant valves. Without this feature, high pressure differentials would be developed across the piston at the beginning of each stroke, with consequent high mechanical drive forces.

Prior art disclosing the foregoing principles includes the applicant's earlier specification WO 2004/016947.

Some aspects of the current invention differ from prior art in having novel means to control the axial motion of the piston relative to the cylinder or piston rod. This can reduce the sensitivity of the pump to operating pressures and pressure pulses, thus allowing simpler application and faster running. These aspects of the invention are set out respectively in claims 1, 10 and 19.

Another aspect of the current invention provides a two-part moving element within each pump valve which can lessen the need for close-tolerance manufacture. This aspect of the invention is set out in claim 16.

Other preferred features of the invention are set out in the dependent claims. All of the claims are deemed repeated here as consistory clauses.

The invention now will be described merely by way of example with reference to the accompanying drawings, wherein.

Figure 1:
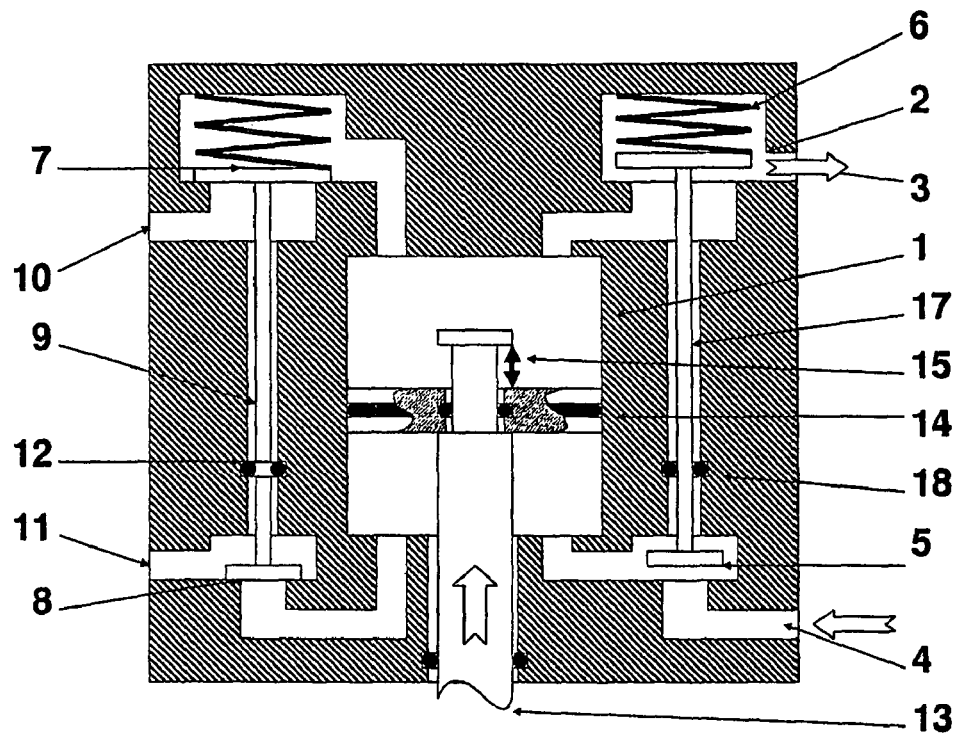
FIG. 1 shows schematically a single cylinder of a prior art pump and motor unit.

Referring to FIG. 1, this figure is provided to put the invention in context. It is based on FIGS. 1 and 7 of WO 2004/019647, with some modification. In order to avoid unnecessary repetition in the present specification, the reader is invited to refer to that earlier specification for details of construction and operation which are applicable also to the embodiments hereafter described, whilst bearing in mind that in '647 the motor valves open against the flow rather than with the flow as is FIG. 1.

Briefly, the pump and motor unit consists of a pump body having a double-acting piston 14. The piston 14 is free to reciprocate in a cylinder 1 formed in the pump body. The piston subdivides the cylinder into an upper pumping chamber and a lower driving chamber although this configuration could be reversed if desired. Pumped flow can enter the pumping chamber via a pump inlet port 10 and a pump inlet valve 7, and can leave via a pump outlet valve 2 and pump outlet port 3. Driving flow can enter the driving chamber via motor inlet port 4 and motor inlet valve 5, and can leave via motor outlet valve 8 and motor outlet port 11. The pumped flow may be delivered for example to a reverse osmosis unit as described hereafter, the driving flow then being the return (waste) flow from the unit. A circumferential piston seal restricts leakage between the upper and lower chambers of the cylinder. A piston rod 13 passes through the lower chamber to a convenient source of mechanical power such as an electric motor, for example via a crankshaft. A rod seal restricts leakage between the piston rod and the pump body. The piston can move axially relative to the piston rod on a reduced-diameter portion thereof as shown at 15.

The swept volume of the driving chamber is less than that of the pumping chamber by a fraction equal to the piston rod area divided by the piston area, plus or minus a relatively small quantity arising from relative movement between the piston 14 and the rod 13 as described hereafter. Because of this difference in swept volumes, the driving fluid flow rate is less than the pumped fluid flow rate by the same fraction.

The pump inlet valve 7 is biased towards its closed position by a valve spring and mechanically connected to the motor outlet valve 8 via a valve stem 9, which is sealed against leakage where it passes through the pump body by a seal 12. In a similar manner the pump outlet valve 2 is biased by valve spring 6 and connected to the motor inlet valve 5 via a valve stem 4, which is sealed against leakage where it passes through the pump body by a seal 18. The valves 2, 5, 7 and 8 are flat-faced (radial-seat) non-return poppet valves.

In application to reverse osmosis desalination, operating pressures would typically be 1 bar gauge at the pump inlet, 60 bar gauge at the pump outlet, 58 bar gauge at the motor inlet and 1 bar gauge at the motor outlet.

The piston rod 13 is shown on an upward, pumping stroke, the piston 14 being held against the lower limit of its axial travel relative to the piston rod by the pressure differential across the piston. Pumped fluid from the top of the cylinder 1 leaves via pump outlet port 3 after passing through pump outlet valve 2. Driving fluid enters through motor inlet port 4 and passes to the bottom of cylinder 1 via motor inlet valve 5. The valves 2 and 5 are opened and held open against return spring 6 by the pressure differential across each said valve.

Pump inlet valve 7 is held shut mainly by the pressure differential across it, the pump outlet pressure from the top of the cylinder being applied to its top surface and the obviously lower pump inlet pressure being applied to its lower surface. Motor outlet valve 8 is held shut by its connection to pump inlet valve 7 via valve stem 9, as it would otherwise be opened by the pressure differential across it, the motor inlet pressure from the bottom of cylinder 1 being applied to its bottom face and the motor outlet pressure being applied to its top face. The relative sizes of valves 7 and 8 are chosen to ensure that the closing force applied by valve 7 exceeds the opening force on valve 8. Leakage flow between pump inlet port 10 and motor outlet port 11 is prevented by seal means 12.

At the end of the pumping stroke piston rod 13 and piston 14 stop, causing flow through valves 2 and 5 to cease, allowing them to be closed by spring 6.

At the start of the return stroke, piston rod 13 begins to move downwards. Since axial movement 15 is permitted between rod 13 and piston 14, piston 14 remains substantially stationary but is free to move slightly to equalise pressures across it as the movement of the rod reduces the pressure of the fluid in cylinder 1. The amount of relative movement 15 required depends on the bulk modulus of the working fluid and the volume and stiffness of the pump unit's internal volumes. Typically relative movement 15 would be 5% to 20% of the piston rod stoke. Once the cylinder pressures are reduced to levels comparable with the pump inlet and motor outlet pressures, the limit of relative movement 15 is reached, piston 14 starts to move with rod 13 causing pump inlet valve 7 and motor outlet valve 8 to open.

Stroke reversal at the end of the return stroke follows a sequence similar to that described for the end of the pumping stroke. The initial movement of rod 13 increases the pressures in cylinder 1 to levels comparable with the pump outlet and motor inlet pressures, prior to the opening of pump outlet valve 2 and motor inlet valve 5.

Figure 2:
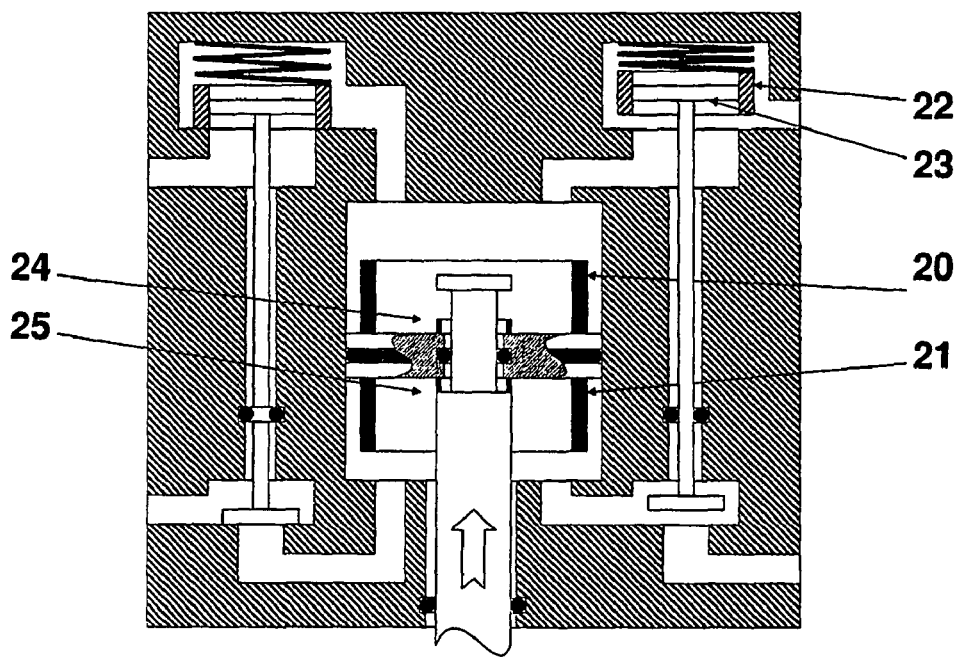
FIG. 2 shows a pump and motor unit of the present invention.

FIG. 2 shows the same pump and motor unit as FIG. 1 but embodying features of the current invention, aimed to overcome problems with prior art.

Piston end stop means are fitted between the piston and the cylinder, for example cylindrical structures 20 and 21 carried by and projecting from the piston 14, to stop the piston when the piston rod stops at either end of its stroke. Prior art relies on operating pressures alone to do this. Without said means, operating pressures may allow the piston to continue moving after the rod has stopped. This will reduce the relative movement between the piston and the rod that is available to permit equalisation of pressures across the piston during pressurisation and depressurisation of the cylinder during stroke reversal. Without said equalisation of pressures, high pressure differentials will be developed across the piston, leading to transient overloading of the mechanical drive and cavitation damage within the pump unit. The piston end stops 20, 21 may be substantially rigid (eg. of acetal or a comparable plastics material), or may incorporate elastic means to absorb and return the kinetic energy of the piston and fluid flows. Thus the end stops may be of rubber, and may be waisted to provide consistent deformation under axial load. Alternatively the end stops may be generally cylindrical compression springs. The term "cylindrical" is used herein to mean a body of rotation having ends perpendicular to its axis; it need not be of constant diameter throughout its axial length.

Piston-rod buffer means 24 and 25 are fitted between the piston and those parts of the piston rod limiting axial movement of the piston relative to the rod. Said buffer means preferably incorporate elasticity to reduce transient loads and pressures when the piston reaches the limits of its travel relative to the piston rod. Thus the buffers 24, 25 may be of similar construction to the end stops 20, 21.

The piston end stops and piston rod buffers may be incorporated with the piston as part of a single piston moulding Each pump valve has a moving element consisting of two main parts: an annular valve sleeve 22 and a valve plug 23, plug 23 being free to slide axially within sleeve 22. Appropriate seal means are incorporated to prevent leakage between plug 23 and sleeve 22. For example, an O ring may be used. Friction of the seal is not critical, provided the friction force is less than the considerable pressure force on the plug. Plug 23 is connected to the corresponding motor valve to control its operation via the valve stem. Since plug 23 is free to slide within sleeve 22, there is need neither for expensive close-tolerance manufacture to ensure that both pump and a rigidly connected motor valve can close fully, nor for the connection between them to incorporate means to permit relative motion between them.

Each pump valve may be manufactured as a sub-assembly with its connected motor valve, and the same sub-assembly used twice for each cylinder.

As shown in FIGS. 1 and 2, all valves open by upward movement of the moving elements and the closing forces applied to the moving elements of motor valves 5 and 8 are downward via compression in valve stems 9 and 17. It is also possible to configure either of both of the connected pairs of pump and motor valves to open by downward movement of the moving elements, with closure of the motor valves effected by upward forces via tension in the valve systems. This may offer advantages in manufacture.

Figure 3:
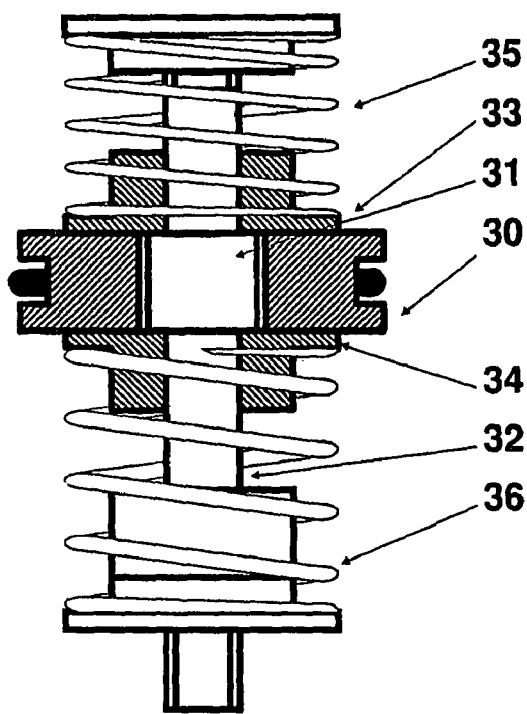
FIG. 3 shows part of a further embodiment of the invention.
Figure 4:
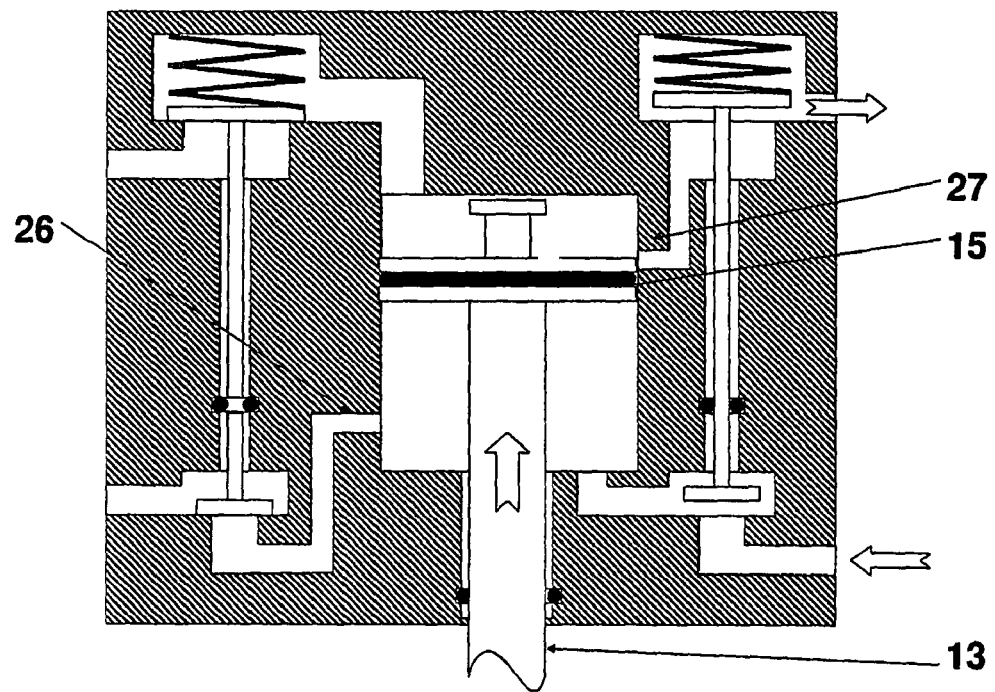
FIG. 4 shows another part of a further embodiment of the invention.

FIG. 3 shows an alternative mounting of the piston to the piston rod. At rest, with no pressure differential across it, the piston 30 surrounds an enlarged portion 31 of the piston rod 32. It is held in this position by an upper washer 33 and a lower washer 34, which are acted on by an upper compression spring 35 and a lower compression spring 36. This arrangement fixes the axial position of the piston 30 relative to the rod 32 until a pressure differential across the piston causes a force on the piston exceeding the force applied by the relevant spring. The spring rates and preload forces of springs 35 and 36 may be chosen to prevent the piston continuing to move after the piston rod has stopped at stroke end, while allowing substantial equalisation of pressures across the piston at the start of each stroke. Reasons for the desirability of this are outlined for FIG. 2 above FIG. 4 shows a means of achieving a similar effect to that achieved by the piston end stops 20 & 21, shown in FIG. 2, and for the similar reasons. Outlet ports 26 & 27 are positioned so that they are partially occluded or blocked by the piston 15 at the ends of its travel. The consequent flow restriction causes a back-pressure preventing the piston from moving further once the piston rod has reached the end of its travel.

Figure 5:
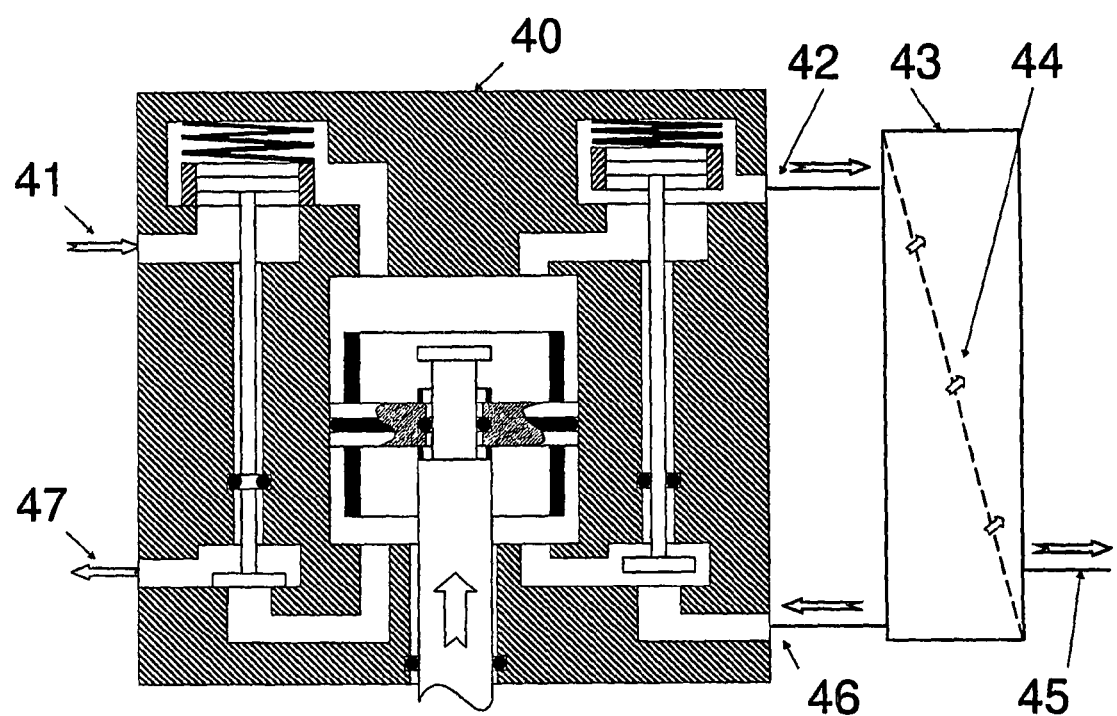
FIG. 5 shows the embodiment of FIG. 2 installed as part of a reverse osmosis or ultra filtration system.

FIG. 5 shows a reverse osmosis system incorporating a pump and motor unit as previously described. An inlet solution flow at low pressure enters the pump and motor unit 40 through pump inlet port 41 and leaves the pump through pump outlet port 42 at high pressure. The inlet solution then enters a membrane assembly 43. A proportion the solvent, but little of the solute, passes through a semi-permeable membrane 44 and leaves the membrane through outlet 45. The remaining flow of concentrated solution leaves the membrane assembly at high pressure, enters the pump through the motor inlet port 46, and leaves the pump through motor outlet port 47 at low pressure. The ratio of piston rod area divided by piston area needs to match the ratio of solvent flow through the membrane divided by solution flow into the membrane assembly. The pump could also be applied to ultrafiltration, using a system as described above for reverse osmosis, but having a filter medium in place of the semi-permeable membrane.

Each feature disclosed in this specification (which term includes the claims) and/or shown in the drawings may be incorporated in the invention independently of other disclosed and/or illustrated features.

Statements in this specification of the "objects of the invention" relate to preferred embodiments of the invention, but not necessarily to all embodiments of the invention falling within the claims.

The description of the invention with reference to the drawings is by way of example only.

The text of the abstract filed herewith is repeated here as part of the specification.

A pump powered partly by a mechanical drive and partly by a pressurised fluid flow, offering energy savings up to 80% in reverse osmosis systems.

The pump consists of one or more piston-in-cylinder assemblies. One face of each piston provides a pumping action while a pressurised driving fluid flow is applied to the opposite piston face, thus supplementing the drive force applied to each piston via a piston rod. Input and output of the pumped flow is controlled by pump valves of a non-return poppet type operated by the pumped flow. Input and output of the driving fluid is controlled by poppet-type valves controlled by connection to the pump valves.

There are means to control piston movement relative to the cylinder and to the piston rod, and a two-part pump valve to simplify connection to the motor valves.

The invention claimed is:

1. A fluid pump and motor unit comprising:
   a pump body having formed therein
      a cylinder,
      a first flow path extending from a pump inlet port through a first portion of said cylinder to a pump outlet port, and
      a second flow path extending from a motor inlet port through a second portion of said cylinder to a motor outlet port;
   a piston rod axially reciprocal in a pumping stroke direction and a return stroke direction and having a distal end portion extending through a passageway in said pump body and into said cylinder, said distal end portion having
      a distal rod stop, and
      a proximal rod stop axially separated from said distal rod stop;
   a piston disposed within said cylinder and separating said first and second flow paths; said piston being slideably connected to said distal end portion and being free to move axially relative to said piston rod between said distal rod stop and said proximal rod stop, said piston being engageable by said proximal rod stop and drivable by said piston rod in the pumping stroke direction to pump a first fluid flow through said first flow path, and engageable by said distal rod stop and drivable by said piston rod in the return stroke direction within said cylinder, said piston also being at least partially drivable by a second fluid flow through said second flow path,
   a first pair of associated valves respectively disposed in an upstream part of said first flow path and a downstream part of second flow path, a second pair of associated valves respectively disposed in a downstream part of said first flow path and an upstream part of second flow path, and means normally biasing the valves toward their flow path closing positions; and
   piston stop means for limiting piston travel in at least one stroke direction within said cylinder to at least one of the following two positions;
      (1) a piston position proximate the position in which the piston would be if it were in engagement with the proximal rod stop when the piston rod is at the end of its pumping stroke, and
      (2) a piston position proximate the position in which the piston would be if it were in engagement with the distal rod stop when the piston rod is at the end of its return stroke.

2. A fluid pump and motor unit as recited in claim 1 wherein said piston stop means includes at least one piston end stop that is carried by said piston on at least one end thereof and adapted to engage a corresponding axial end of said cylinder to thereby limit axial travel of said piston in a corresponding direction within said cylinder.

3. A fluid pump and motor unit as recited in claim 2 wherein said at least one piston end stop is made of a substantially rigid material.

4. A fluid pump and motor unit as recited in claim 2 wherein said at least one piston end stop is made of an elastic material configured to create pressure differentials at stroke end favorable to valve operation and reduction of transient loads.

5. A fluid pump and motor unit as recited in claim 1 wherein said piston stop means includes at least one piston stop disposed within said first and/or second portions of said cylinder.

6. A fluid pump and motor unit as recited in claim 1 wherein said piston stop means is formed by configuring at least one of said first and second flow paths such that when said piston is in one of said two positions it causes the flow of fluid through said cylinder to be restricted sufficient to prevent further movement of the piston in the corresponding travel direction.

7. A fluid pump and motor unit as recited in claim 1 wherein at least one pair of said first and second pairs of associated valves includes a first valve disposed in said first flow path and a second valve disposed in said second flow path, said first valve being responsive to a pressure differential thereacross and operative to control the first fluid flow, said first valve having a moveable element including a first part for controlling the first fluid flow and a second part sealingly engaging said first part and having an operational connection to the second valve for controlling the second fluid flow.

8. A fluid pump and motor unit as recited in claim 7 wherein said first part is an annular sleeve and said second part is a plug configured to frictionally engage and slide within the sleeve.

9. A fluid pump and motor unit as recited in claim 1 and further comprising buffer means disposed between said piston and at least one of said rod stops to reduce transient loads and pressures when said piston reaches at least one of the limits of its travel relative to said piston rod.

10. A fluid pump and motor unit as recited in claim 1 wherein said buffer means is made of an elastic material adapted to absorb and/or return kinetic energy.

11. In a fluid filtration system including a filtering medium having a high pressure side and a low pressure side, at least one fluid pump and motor system for providing a high pressure flow of fluid to be filtered, and mechanical drive means for powering each fluid pump and motor system, an improved fluid pump and motor system comprising:
- a pump body having formed therein a cylinder, a first flow path which traverses from a pump inlet port through a first portion of said cylinder to a pump outlet port connected to an input port on the high pressure side of the filtering medium, and a second flow path which traverses from a motor inlet port connected to an outlet port on the high pressure side of the filtering medium and through a second portion of said cylinder to a motor outlet port;
- an axially reciprocal piston rod moveable in a pumping stroke direction and a return stroke direction, said piston rod having a distal end portion extending through a passageway in said pump body and into said cylinder, said distal end portion having a first rod stop and a second rod stop axially separated from said first stop;
- a piston disposed within said cylinder and separating said first and second flow paths; said piston being slideably connected to said distal end portion and being free to move axially relative to said piston rod between said first rod stop and said second rod stop, said piston being reciprocally drivable within said cylinder by said piston rod to pump a first fluid flow through said first flow path, said piston being at least partially drivable by a second fluid flow through said second flow path,
- a first pair of associated valves respectively disposed in an upstream part of said first flow path and a downstream part of said second flow path, a second pair of associated valves respectively disposed in a downstream part of said first flow path and an upstream part of said second flow path, and means normally biasing the valves toward their flow path closing positions; and
- piston stop means for limiting piston travel in at least one stroke direction within said cylinder to at least one of the following two positions;
  (1) a piston position proximate the position in which the piston would be if it were in engagement with the proximal rod stop when the piston rod is at the end of its pumping stroke, and
  (2) a piston position proximate the position in which the piston would be if it were in engagement with the distal rod stop when the piston rod is at the end of its return stroke.

12. In a fluid filtration system as recited in claim 11 wherein said piston stop means includes at least one piston end stop carried by said piston and adapted to engage a particular part of said cylinder and thereby limit axial travel of said piston in at least one direction within said cylinder.

13. In a fluid filtration system as recited in claim 12 wherein said at least one piston end stop is made of a substantially rigid material.

14. In a fluid filtration system as recited in claim 12 wherein said at least one piston end stop is made of an elastic material configured to create pressure differentials at stroke end favorable to valve operation and reduction of transient loads.

15. In a fluid filtration system as recited in claim 11 wherein said piston stop means includes at least one piston end stop disposed within said first and/or second portions of said cylinder.

16. In a fluid filtration system as recited in claim 11 wherein said piston stop means is formed by configuring at least one of said first and second flow paths such that in at least one piston travel position said piston causes a volume of fluid to be restricted sufficient to prevent further movement of the piston in a corresponding direction.

17. In a fluid filtration system as recited in claim 11 wherein said first pair of associated valves includes a first valve disposed in said first flow path and a second valve disposed in said second flow path, said first valve being responsive to a pressure differential thereacross and operative to control the first fluid flow, said first valve having a moveable element including a first part for controlling the first fluid flow and a second part sealingly engaging said first part, said second part being configured to respond to a pressure differential across said first valve and having an operational connection to said second valve for controlling the second fluid flow.

18. In a fluid filtration system as recited in claim 17 wherein said first part is an annular sleeve and said second part is a plug configured to frictionally engage and slide within the annular sleeve.

19. In a fluid pump and motor unit as recited in claim 11 and further comprising buffer means disposed between said piston and said rod stops to reduce transient loads and pressures when said piston reaches the limits of its travel relative to said piston rod.

20. In a fluid pump and motor unit as recited in claim 19 wherein said buffer means is made of an elastic material adapted to absorb and/or return kinetic energy.

* * * * *